US012780626B2

(12) United States Patent
Böhler

(10) Patent No.: US 12,780,626 B2
(45) Date of Patent: Nov. 3, 2026

(54) AUTONOMOUSLY MOVING TRANSPORT SYSTEM FOR TRANSPORTING PALLETS AND/OR PALLET CAGES AND METHOD OF OPERATING SUCH AN AUTONOMOUSLY MOVING TRANSPORT SYSTEM

(71) Applicant: SICK AG, Waldkirch (DE)

(72) Inventor: Frank Böhler, Breisach-Gündlingen (DE)

(73) Assignee: SICK AG, Waldkirch (DE)

( * ) Notice: Subject to any disclaimer, the term of this patent is extended or adjusted under 35 U.S.C. 154(b) by 138 days.

(21) Appl. No.: 18/213,372

(22) Filed: Jun. 23, 2023

(65) Prior Publication Data

US 2023/0416063 A1 Dec. 28, 2023

(30) Foreign Application Priority Data

Jun. 24, 2022 (DE) ......................... 102022115797.0

(51) Int. Cl.
*B66F 9/06* (2006.01)
*B66F 9/075* (2006.01)
(Continued)

(52) U.S. Cl.
CPC ................ *B66F 9/063* (2013.01); *B66F 9/06* (2013.01); *B66F 9/0755* (2013.01); (Continued)

(58) Field of Classification Search
CPC .......... B66F 9/063; B66F 9/06; B66F 9/0755; B66F 17/003; G05D 1/2427; G05D 1/618; G05D 2107/70
See application file for complete search history.

(56) References Cited

U.S. PATENT DOCUMENTS 5,638,387 A * 6/1997 Palleggi ................ B66F 9/0755 318/67
9,676,551 B2 * 6/2017 Toebes ................... B25J 9/1674
(Continued)

FOREIGN PATENT DOCUMENTS

CN 113703460 A 11/2021
DE 102019215180 A1 4/2021
(Continued)

OTHER PUBLICATIONS

Translation of JP H08217246 A, 14 pages (Year: 1996).*
(Continued)

*Primary Examiner* — Dale W Hilgendorf
(74) *Attorney, Agent, or Firm* — Nath, Goldberg & Meyer; Jerald L. Meyer; Stanley N. Protigal

(57) ABSTRACT

An autonomously moving transport system uses a control apparatus to provide obstacle recognition so that available storage space can be used as efficiently as possible. The control apparatus comprises a data processing unit and an obstacle recognition device having a first sensor unit. The first sensor unit is configured to monitors a free placement area for obstacles. In the absence of an obstacle, the control apparatus adopts a placement operating mode to move the pallet and/or the pallet cage into the free placement area. The obstacle recognition device is configured to limit the monitored field to the free placement area or to deactivate the monitored field or not to output an obstacle recognition signal during the travel over the free placement area. Alternatively, the data processing unit is configured to ignore an obstacle recognition signal of the obstacle recognition device during the travel over the free placement area.

15 Claims, 5 Drawing Sheets

(51) Int. Cl.
*B66F 17/00* (2006.01)
*G05D 1/242* (2024.01)
*G05D 1/617* (2024.01)
*G05D 107/70* (2024.01)

(52) U.S. Cl.
CPC ......... *B66F 17/003* (2013.01); *G05D 1/2427* (2024.01); *G05D 1/618* (2024.01); *G05D 2107/70* (2024.01)

(56) References Cited

U.S. PATENT DOCUMENTS

| | | | | |
|---|---|---|---|---|
| 9,862,543 | B2 * | 1/2018 | Toebes | B65G 1/0492 |
| 11,667,502 | B2 * | 6/2023 | Roethling | B66F 17/003 701/50 |
| 2005/0034908 | A1 * | 2/2005 | Raetze | B66F 9/0755 180/167 |
| 2006/0287759 | A1 * | 12/2006 | Charych | B66F 9/0755 700/213 |
| 2010/0266381 | A1 * | 10/2010 | Chilson | B66F 9/063 414/809 |
| 2011/0077814 | A1 * | 3/2011 | Haberer | G01S 7/4812 701/28 |
| 2011/0153139 | A1 * | 6/2011 | Erb | G01S 7/4812 701/28 |
| 2011/0202247 | A1 | 8/2011 | Takeoka | |
| 2012/0197431 | A1 * | 8/2012 | Toebes | B65G 1/0492 901/1 |
| 2014/0277691 | A1 * | 9/2014 | Jacobus | B66F 9/063 700/216 |
| 2017/0015537 | A1 * | 1/2017 | Bosworth, III | B60K 35/10 |
| 2018/0089616 | A1 * | 3/2018 | Jacobus | G05D 1/0274 |
| 2018/0129220 | A1 * | 5/2018 | Beach | B66F 9/063 |
| 2019/0278281 | A1 * | 9/2019 | Sakai | B60L 50/60 |
| 2020/0101971 | A1 | 4/2020 | Fan et al. | |
| 2020/0102147 | A1 * | 4/2020 | Sullivan | G05D 1/225 |
| 2020/0239242 | A1 * | 7/2020 | Hoofard | G05D 1/622 |
| 2020/0377350 | A1 * | 12/2020 | Nonogaki | B66F 9/148 |
| 2021/0101789 | A1 * | 4/2021 | Roethling | B66F 17/003 |
| 2021/0316975 | A1 * | 10/2021 | Yeo | B66F 9/063 |
| 2022/0177222 | A1 * | 6/2022 | Ji | B66F 9/0755 |
| 2022/0382289 | A1 * | 12/2022 | Jarsch | B62D 65/18 |
| 2025/0130580 | A1 * | 4/2025 | Guja | B65G 67/20 |

FOREIGN PATENT DOCUMENTS

| | | | | |
|---|---|---|---|---|
| DE | 102020102513 | A1 | 8/2021 | |
| EP | 2339376 | A1 | 6/2011 | |
| JP | H08217246 | A * | 8/1996 | B65G 57/03 |
| WO | 2021/069674 | A1 | 4/2021 | |

OTHER PUBLICATIONS

European Search Report dated Nov. 16, 2023 issued in corresponding European Application No. 23179772.1.
"Brochure" ChatGPT zu IFOY Award 2014.
"Brochure" IFOY Award 2014 Jungheinrich APM.
"Test report" IFOY Award 2014 Testbericht international forklift truck of the year 2014 IFOY Testbericht—Jungheinrich Auto Pallet Mover.

* cited by examiner

AUTONOMOUSLY MOVING TRANSPORT SYSTEM FOR TRANSPORTING PALLETS AND/OR PALLET CAGES AND METHOD OF OPERATING SUCH AN AUTONOMOUSLY MOVING TRANSPORT SYSTEM

FIELD

The invention relates to an autonomously moving transport system, in particular an autonomously moving lift truck, in particular in the form of a fork-lift truck for transporting pallets and/or pallet cage, and to a method of operating such an autonomously moving transport system.

BACKGROUND

Pallets with goods or pallet cages with goods are arranged next to one another in a row in a space-saving manner in production or logistics. For this purpose, the pallet or the pallet cage is pushed into a free space (free placement area). Recently, this also takes place in an automated manner by means of automated guided vehicles (AGV). To ensure that no person is injured who is in the free space, the pallets or pallet cages are placed next to one another such that there is still an escape route for the person. Often, a full space is left empty next to a placed-down pallet or pallet cage. This storage space can then no longer be used.

SUMMARY

It is therefore the object of the present invention to create an autonomously moving transport system for transporting pallets and/or pallet cages, by which transport system the available storage space can be used as efficiently as possible.

The object is satisfied by the autonomously moving transport system and a method of operating such an autonomously moving transport system.

The autonomously moving transport system in accordance with the invention in particular serves to transport pallets and/or pallet cages. The transport system comprises a pick-up apparatus for picking up such a pallet and/or pallet cage. The transport system furthermore has a drive unit and a control apparatus. The control apparatus has a data processing unit and an obstacle recognition device having a first sensor unit. The obstacle recognition device is configured via the first sensor unit to generate a monitored field in order to examine, with the monitored field, a free placement area for the pallet and/or the pallet cage between other pallets and/or pallet cages for obstacles. The control apparatus is configured to control the drive unit such that the transport system (in the absence of an obstacle) adopts a placement operating mode and moves the pallet and/or the pallet cage into the free placement area for placement. In a first alternative, the obstacle recognition device is configured in the placement operating mode to limit the monitored field to the free placement area or to deactivate the monitored field or not to output an obstacle recognition signal during the travel over the free placement area, at least until the placement of the pallet and/or the pallet cage on the free placement area. This takes place by controlling the first sensor unit accordingly. In another alternative, the data processing unit is configured in the placement operating mode to ignore an obstacle recognition signal of the obstacle recognition device during the travel over the free placement area, at least until the placement of the pallet and/or the pallet cage on the free placement area.

The autonomously moving transport system is in particular a self-driving and self-navigating vehicle. The transport system is preferably configured to automatically pick up and unload loads (i.e., for example, the pallets and pallet cages mentioned herein). The transport system can e.g. be a ground conveyor or a lift truck, in particular in the form of a fork-lift truck.

It is particularly advantageous that the autonomously moving transport system in accordance with the invention first detects, by means of a monitored field, whether there are obstacles on a free placement area for the pallet and/or the pallet cage. If there are no obstacles (for example, persons or objects) on the free placement area, the transport system switches to the placement operating mode. In this placement operating mode, the monitored field can, for example, be (continuously) limited to the free placement area and can thus be reduced in size. In this case, the monitored field does not detect adjacent pallets and/or pallet cages so that no obstacle recognition signal is output. Alternatively, the monitored field can be deactivated. In this respect, the distance traveled can be monitored so that it is ensured that the transport system does not travel beyond the cleared area. Alternatively, no obstacle recognition signal is output despite the monitored field being activated or such an obstacle recognition signal is ignored and the travel is continued. This is possible without problem since before entering the free placement area, it has already been examined for obstacles. Therefore, there are two measures that allow a more efficient use of the storage space. On the one hand, the free placement area is scanned with a monitored field immediately before the free placement area is traveled over and, on the other hand, care is taken that no safety reaction of the obstacle recognition device is triggered which would interrupt the placement process and the pallets and/or pallet cages can therefore be placed very close to one another. The wording "immediately" in particular means that the free placement area is examined for obstacles less than seconds, 5 seconds or less than 3 seconds before traveling over it in order thereby to ensure that another person does not move in. Other sensor units that are likewise configured to detect obstacles and that do not serve to monitor the free placement area can further preferably remain activated in order thereby to be able to detect persons who approach the autonomously moving transport system and may attempt to laterally pass the autonomously moving transport system and enter the free placement area. During such a detection, the autonomously moving transport system preferably stops or leaves the free placement area again.

In an advantageous embodiment, the control apparatus is configured to control the drive unit such that the transport system only travels on the cleared region of the placement area in the placement operating mode. Collisions are thereby also prevented when the obstacle recognition device is deactivated.

In a further advantageous embodiment, the data processing unit is configured to control the obstacle recognition device such that the latter limits its monitored field to the part of the free placement area that has not yet been traveled over. A continuous adaptation of the monitored field thereby takes place. It is pointed out that it is the first sensor unit that generates the monitored field of the obstacle recognition device that is used to monitor the free placement area.

In a further advantageous embodiment, the transport system comprises an encoder unit. The encoder unit is configured to continuously determine a distance traveled in the placement operating mode, wherein the obstacle recognition device is configured to continuously limit the monitored field based on the distance determined (to the part of the free placement area that has not yet been traveled over). The monitored field is in particular reduced by the amount of the distance traveled.

In a further advantageous embodiment, the encoder unit is arranged at a drive shaft of the drive unit. The distance traveled can thereby be determined particularly accurately.

Alternatively or additionally, the distance traveled can also be determined via another localization system, for example optically by means of a LiDAR (Light Detection and Ranging) or by radio via a Real Time Locating System (RTLS) using an Ultra Wideband (UWB), a Wireless Local-Area Network (WLAN) and/or a Universal Mobile Telecommunications System (UMTS).

In a further advantageous embodiment, the obstacle recognition device is configured to limit the monitored field by adjusting the radiation angle of the first sensor unit. It is generally conceivable for the entire first sensor unit to be tilted and/or rotated to change the angular position. It would also be possible for a mirror to be adjusted within the first sensor unit so that the monitored field limits a reduced region (the part of the free placement area that has not yet been traveled over).

In a further advantageous embodiment, the obstacle recognition device or the data processing unit is configured to limit the monitored field by masking certain regions. This can, for example, take place in that reflections of a transmitted light pulse are only considered within a certain time period for detecting an obstacle.

In a further advantageous embodiment, the first sensor unit is an optical sensor, an acoustic sensor (e.g. ultrasound), or an electromagnetic sensor (e.g. radar). The optical sensor is preferably a ToF sensor (time-of-flight) and/or a laser scanner. The free placement area can thereby be examined with a high resolution for obstacles.

In a further advantageous embodiment, the pick-up apparatus comprises forks. In the case, the transport system is a fork-lift truck.

In a further advantageous embodiment, the first sensor unit is arranged at one end of at least one fork. The free placement area can thereby be particularly easily examined for obstacles. The fork could be correspondingly hollow to pick up connection cables between the first sensor unit and the data processing unit.

In a further advantageous embodiment, the first sensor unit is arranged at a lower region of the transport system. The first sensor unit is in particular arranged at the side of the transport system at which the pick-up apparatus is also located. The control apparatus is configured to control the pick-up apparatus such that the latter raises the pallet and/or the pallet cage so that the monitored field of the first sensor unit extends below the pallet and/or the pallet cage in the direction of the free placement area in order thereby to examine the latter for obstacles. This raising can preferably only take place before the travel over the free placement area. To travel over the free placement area, the pallet and/or the pallet cage could already be lowered again (e.g. in the alternative with the deactivated monitored field).

In a further advantageous embodiment, the obstacle recognition device comprises a second sensor unit. The first sensor unit is arranged at the rear side of the transport system and the second sensor unit is arranged at the front side of the transport system. An obstacle can thereby be recognized in the respective direction of travel both in forward travel (the second sensor unit is used here) and reverse travel (the first sensor unit is used here).

In a further advantageous embodiment, the drive unit is an electrical drive unit. The control apparatus is configured in the placement operating mode to monitor the power consumption of the drive unit. In the event that the power consumption of the drive unit exceeds a threshold value, the control apparatus is configured to control the drive unit such that the latter stops the transport system or moves the transport system out of the free placement area. The power consumption can be an indication of a possible collision. It would generally be conceivable for the control apparatus to adapt the threshold value in dependence on a weight of the picked-up pallet and/or pallet cage. For heavier pallets and/or pallet cages, the threshold value is higher than for lighter pallets and/or pallet cages. An additional safety factor is thereby introduced.

In a further advantageous embodiment, the control apparatus is configured to reduce the speed at which the autonomously moving transport system travels over the free placement area compared to a speed at which the autonomously moving transport system is otherwise moved. The speed at which the autonomously moving transport system travels over the free placement area is preferably less than 1 m/s, 50 cm/s or less than 30 cm/s.

The method in accordance with the invention serves to operate an autonomously moving transport system for transporting pallets and/or pallet cages. In a first method step, a monitored field is generated. This preferably takes place by a first sensor unit of an obstacle recognition device. With this monitored field, a free placement area for a pallet and/or pallet cage to be placed (which the transport system takes along) between other pallets and/or pallet cages is examined for obstacles (persons and/or objects). In a second method step, the drive unit is controlled such that the transport system, in the absence of an obstacle (the monitored field does not detect an obstacle in the free placement area), adopts a placement operating mode and moves the pallet and/or the pallet cage into the free placement area for placement. This control preferably takes place by the control apparatus. In a third method step, the monitored field is (continuously) limited to the free placement area. Alternatively, the monitored field is deactivated. Alternatively, an obstacle recognition signal is prevented from being output (in particular transmitted to the data processing unit). Alternatively, such an obstacle recognition signal is ignored (by the data processing unit) as long as the transport system is in the placement operating mode.

BRIEF DESCRIPTION OF THE DRAWINGS

The invention will be described purely by way of example with reference to the drawings in the following. There are shown.

DETAILED DESCRIPTION

Figure 1A:
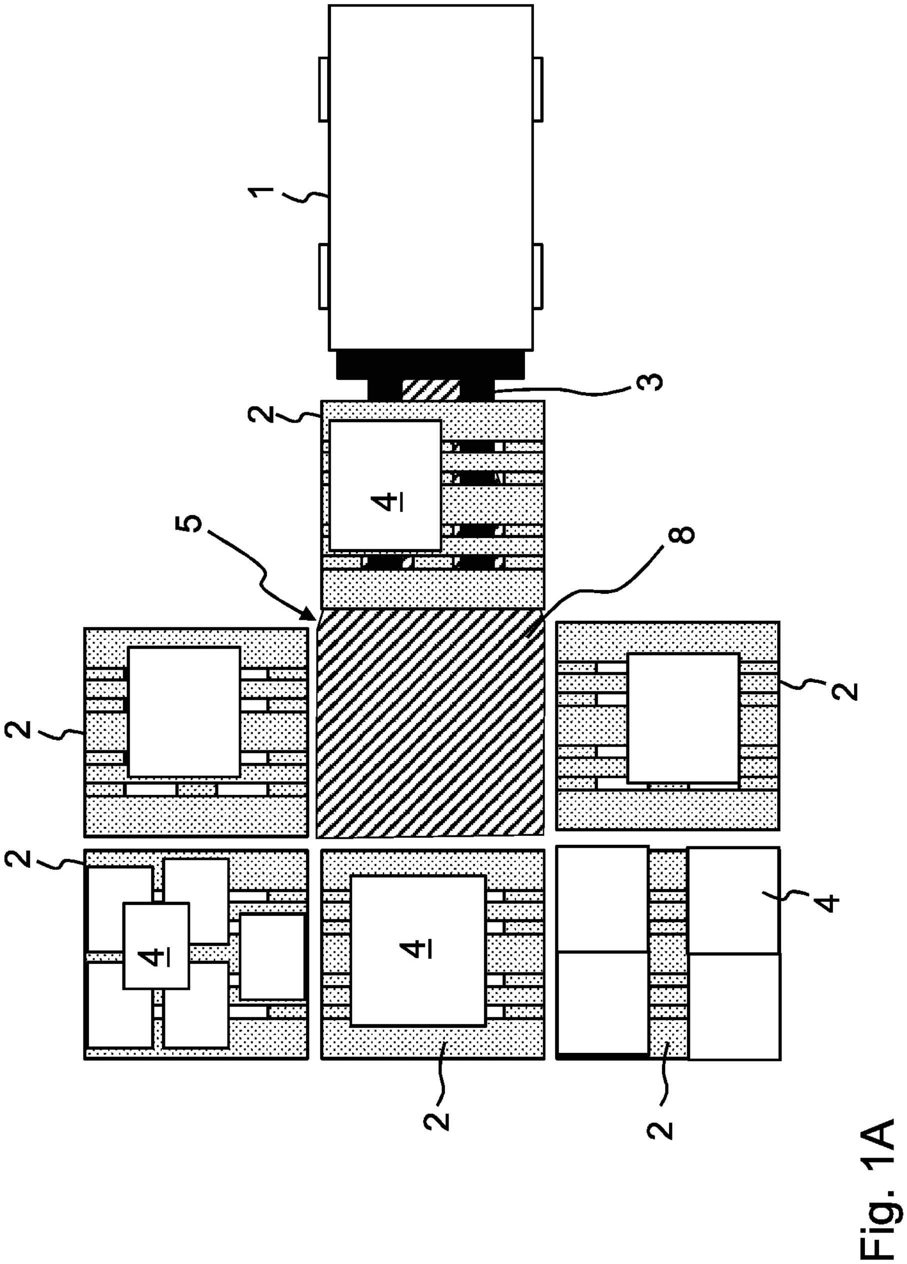
FIG. 1A: An embodiment of the autonomously moving transport system in accordance with the invention, here in the form of a lift truck, that generates a monitored field for detecting obstacles on a free placement area between a plurality of pallets.

FIG. 1A shows an embodiment of an autonomously moving transport system in accordance with the invention, here in the form of a lift truck 1. The lift truck 1 preferably serves to transport pallets 2 and/or pallet cages. To pick up the pallets 2 and/or pallet cages, the lift truck 1 preferably comprises two forks 3. In this case, various goods 4 are arranged on the pallets 2. In FIG. 1A, the pallets 2 are arranged in two columns. A first column comprises three pallets 2 and a second column comprises two pallets 2. Therefore, a free placement area 5 is present in the second column. This free placement area 5 is bounded at three sides by other pallets 2. If the free placement area 5 is now used for the placement of a further pallet 2, when retracting this further pallet 2, there is no escape route for any person who is located on the free placement area 5, for example to sort goods 4 on one of the adjacent pallets 2.

The lift truck 1 comprises a drive unit (not shown). It is preferably an electrical drive unit that is, for example, supplied with electrical energy inductively (e.g. via at least one conductor path in the ground) or via a rechargeable battery. The lift truck 1 furthermore comprises a control apparatus that has 9 having a data processing unit, and an obstacle recognition device 6. The obstacle recognition device 6 comprises a first sensor unit 7*a* and a second sensor unit 7*b* (see FIGS. 2A, 2B, 2C). The first sensor unit 7*a* is arranged at the rear side of the lift truck 1, i.e. where the forks 3 are fastened. The second sensor unit 7*b* is arranged at the front side of the lift truck 1. The lift truck 1 is configured to move to the destination after a picked-up pallet 2 and/or pallet cage with the front side in the direction of travel. This has the advantage that the pallet 2 and/or the pallet cage does/do not cover the second sensor unit 7*b* of the obstacle recognition device 6 that detects obstacles in front of the lift truck 1.

The first sensor unit 7*a* and/or the second sensor unit 7*b* comprises/comprise at least one optical sensor, at least one acoustic sensor, or at least one electromagnetic sensor. It would be conceivable for the first sensor unit 7*a* and the second sensor unit 7*b* to comprise different types of sensors. It would also be conceivable for the first sensor unit 7*a* and the second sensor unit 7*b* to comprise a different number of sensors.

The optical sensor is preferably a ToF sensor and/or a laser scanner. Obstacles in the environment of the lift truck 1 can be determined via times of flight between a transmitted light pulse and a received light pulse that was reflected at an obstacle. The first sensor unit 7*a* is configured to generate a monitored field 8. The second sensor unit 7*b* is likewise configured to generate a monitored field 8. The monitored fields 8 of the first sensor unit 7*a* and the second sensor unit 7*b* can be the same size or different sizes.

In FIG. 1A, the first sensor unit 7*a* is configured to examine, with its monitored field 8, the free placement area 5 for the pallet 2 and/or pallet cage to be placed between other pallets 2 for obstacles. In this case, the monitored field 8 is shown hatched. The shape of the monitored field 8 is only selected by way of example and is only intended to illustrate that the monitored field 8 is directed towards the free placement area 5. The monitored field 8 preferably extends close to the ground. This means that a distance between the ground and the monitored field 8 is preferably smaller than 80 cm, 50 cm, 40 cm, or smaller than 20 cm. The monitored field 8 preferably extends approximately in parallel with the ground. The wording "approximately" preferably also includes deviations of less than 10° or less than 5°.

It would also be conceivable for the monitored field 8 to be incident at an angle on the base of the free placement area 5.

Figure 1B:
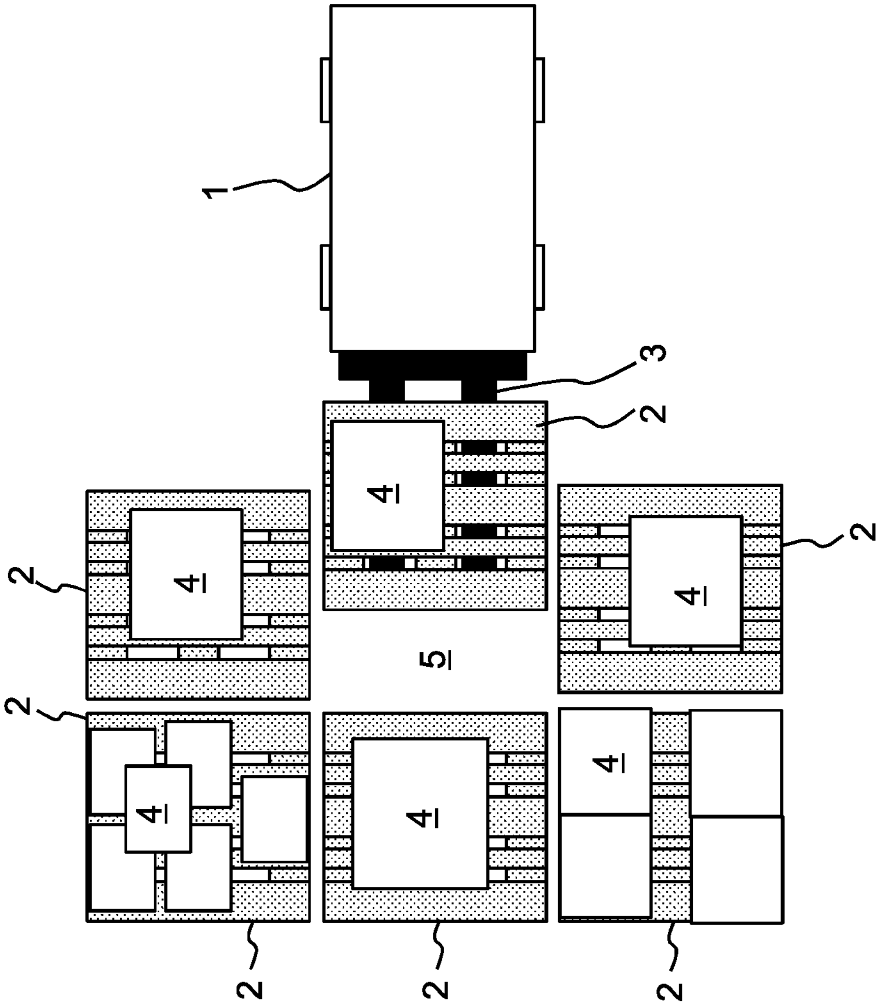
FIG. 1B: shows the lift truck from FIG. 1A that travels over the free placement area for the placement of a picked-up pallet and deactivates its monitored field in the process.

The control apparatus of the lift truck 1 is configured to control the drive unit such that the lift truck 1, in the absence of an obstacle, adopts a placement operating mode. In the placement operating mode, the lift truck 1 moves the pallet 2 and/or the pallet cage into the free placement area 5 for placement. In the placement operating mode, the obstacle recognition device 6 is configured to deactivate the monitored field 8 during the travel over the free placement area 5, at least until the placement of the pallet 2 and/or the pallet cage on the free placement area 5. This can, for example, take place by interrupting the energy supply to the first sensor unit 7*a* or by applying a corresponding control signal to the first sensor unit 7*a*. This circumstance is represented in FIG. 1B.

Figure 1C:
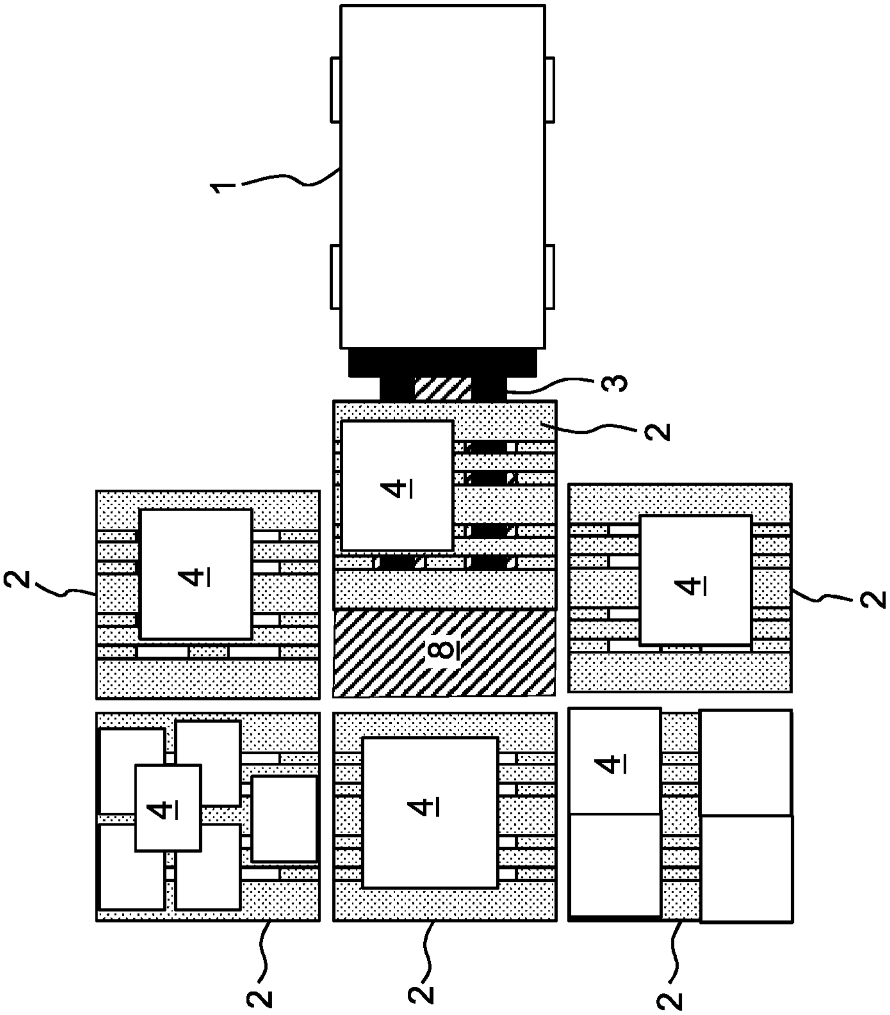
FIG. 1C: shows the lift truck from FIG. 1A that travels over the free placement area for the placement of a picked-up pallet and continuously adapts the size of its monitored field in the process.

Alternatively, the obstacle recognition device 6 is configured to limit the monitored field 8 to the free placement area 5 during the travel over the free placement area 5, at least until the placement of the pallet 2 and/or the pallet cage on the free placement area 5. This circumstance is represented in FIG. 1C. In this case, the data processing unit is configured to control the first sensor unit 7*a* such that the latter limits its monitored field 8 to the part of the free placement area 5 that has not yet been traveled over. For this purpose, the lift truck 1 preferably comprises an encoder unit. The encoder unit is configured to continuously determine a distance traveled in the placement operating mode, wherein the obstacle recognition device 6 is configured to continuously limit, i.e. to reduce the size of, the monitored field 8 (of the first sensor unit 7*a*) based on the distance determined. The "limiting" takes place in that adjacent pallets 2 and/or pallet cages do not generate an obstacle recognition signal. The encoder unit is preferably configured as a rotary encoder and arranged at a drive shaft of the drive unit. The obstacle recognition device 6 is configured to limit the monitored field 8 (of the first sensor unit 7*a*) by adjusting the radiation angle of the first sensor unit 7*a*. This could, for example, take place by tilting the first sensor unit 7*a* or by rotating a mirror within the first sensor unit 7*a*. The further the lift truck 1 travels into the free placement area 5, the greater the angle between the monitored field 8 and the ground could be. The limiting could also take place in that the obstacle recognition device 6 or the data processing unit is configured to limit the monitored field 8 by masking certain regions that extend beyond the free placement area 5. This could take place by ignoring reflected light pulses that are incident after a certain time. In this case, light pulses that reflect adjacent pallets 2 and/or pallet cages could be ignored.

It would generally also be conceivable for the obstacle recognition device 6 to be configured not to output an obstacle recognition signal during the travel over the free placement area 5, at least until the placement of the picked-up pallet 2 and/or the picked-up pallet cage on the free placement area 5.

It would also be conceivable for the data processing unit to be configured to ignore an obstacle recognition signal of the obstacle recognition device 6 during the travel over the free placement area 5, at least until the placement of the pallet 2 and/or the pallet cage on the free placement area 5.

The obstacle recognition device 6 is preferably connected to the data processing unit. This can take place via an electrical or an optical connection. A wireless connection would also be conceivable. The data processing unit, which is part of the control apparatus, is preferably configured to inform the obstacle recognition device 6 that it should limit or deactivate the monitored field 8 of the first sensor unit 7*a* accordingly or that it should not output an obstacle recognition signal. The data processing unit could also simply ignore such an obstacle recognition signal in a placement operating mode.

The data processing unit is preferably configured to control the obstacle recognition device 6 such that either the first sensor unit 7*a* or the second sensor unit 7*b* is activated (generates a monitored field 8) that is arranged at the front at the lift truck 1 in the direction of travel. If the lift truck 1 moves forwards, the second sensor unit 7*b* is activated. If the lift truck 1 moves backwards, the first sensor unit 7*a* is activated. The respective other sensor unit 7*a* or 7*b* is then preferably deactivated or corresponding obstacle recognition signals do not lead to a trigger reaction.

Figure 2A:
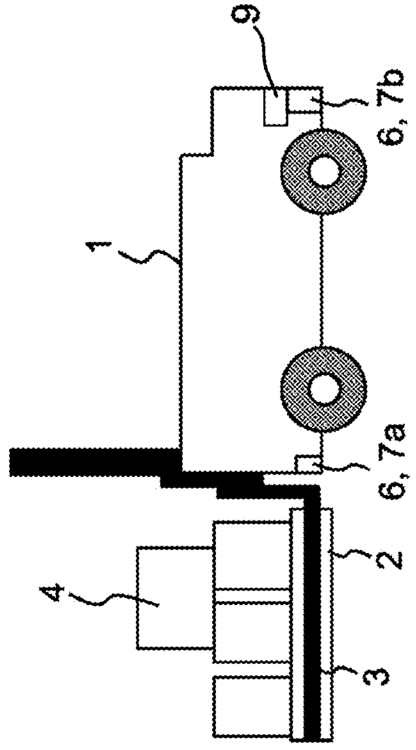
FIG. 2A: an embodiment of the autonomously moving lift truck in accordance with the invention, wherein the obstacle recognition device comprises a first sensor unit and a second sensor unit.
Figure 2B:
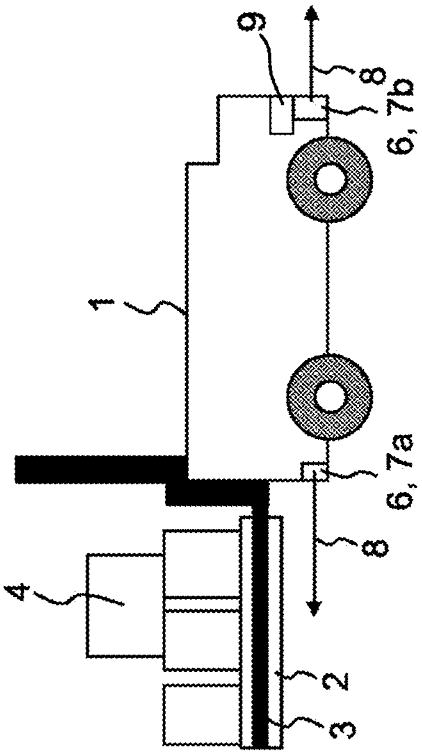
FIG. 2B: an embodiment of the autonomously moving lift truck in accordance with the invention, wherein the first sensor unit generates a monitored field that is transmitted below the picked-up pallet.
Figure 2C:
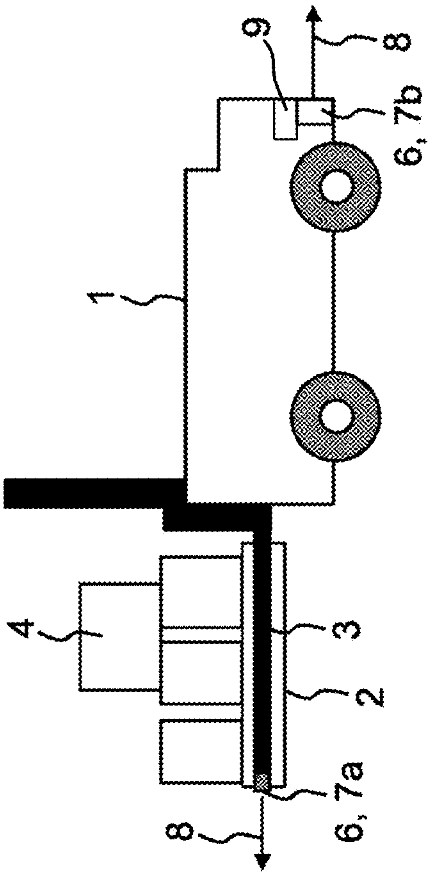
FIG. 2C: an embodiment of the autonomously moving lift truck in accordance with the invention, wherein the first sensor unit is arranged in or at a fork tip.

In FIGS. 2A, 2B, 2C, it is shown where the first sensor unit 7*a* and the second sensor unit 7*b* can be attached to the lift truck 1. In FIGS. 2A, 2B, the first sensor unit 7*a* is arranged at a lower region of the lift truck 1. The control apparatus is configured to control the pick-up apparatus such that the latter raises the picked-up pallet 2 and/or the picked-up pallet cage so that the monitored field 8 of the first sensor unit 7*a* extends below the picked-up pallet 2 and/or below the picked-up pallet cage in the direction of the free placement area 5. It is thereby reliably prevented that pallets 2 or pallet cages loaded with goods 4 cover the monitored field 8. The first sensor unit 7*a* could additionally be arranged spaced apart from the underbody of the lift truck 1 in the direction of the ground (road) so that the pick-up apparatus only has to raise the picked-up pallet and/or the picked-up pallet cage minimally (preferably less than 50 cm, 40 cm, 30 cm, or less than 20 cm).

The monitored field 8 of the second sensor unit 7*b*, on the other hand, is not covered by a pick-up apparatus and the pallet 2 and/or pallet cage picked up by the pick-up apparatus. It would generally be conceivable for the first sensor unit 7*a* to be arranged closer in the direction of the ground than the second sensor unit 7*b*.

In FIG. 2C, it is shown that the first sensor unit 6*a* is arranged at one end of at least one fork 3. It is also ensured by this measure that the monitored field 8 is not covered by the picked-up pallet 2 and/or the picked-up pallet cage.

Figure 3:
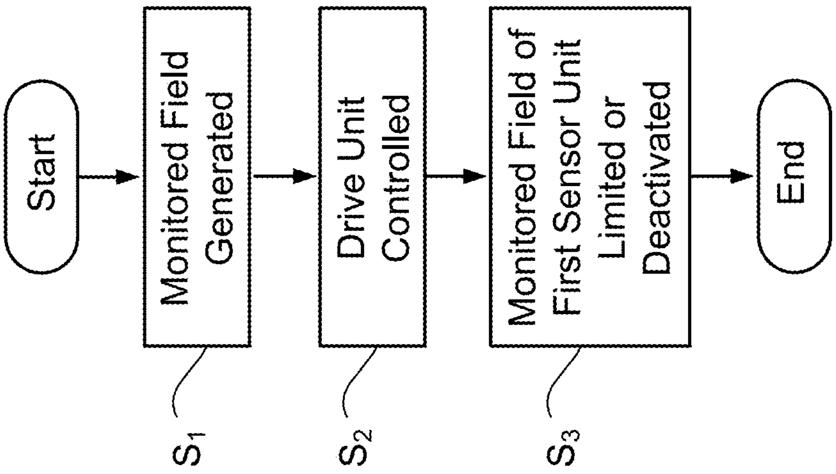
FIG. 3: a method of operating the autonomously moving lift truck.

FIG. 3 describes a method of operating the autonomously moving lift truck 1. In a first method step $S_1$, a monitored field 8 is generated by the first sensor unit 7*a* to examine, with this monitored field 8, the free placement area 5 for the pallet 2 to be placed and/or the pallet cage to be placed between other pallets 2 and/or pallet cages for obstacles.

In the second method step $S_2$, the drive unit is controlled by the control apparatus such that the lift truck 1, in the absence of an obstacle (which is not detected), adopts a placement operating mode and moves the picked-up pallet 2 and/or the picked-up pallet cage into the free placement area 5 for placement.

In the third method step $S_3$, the monitored field 8 of the first sensor unit 7*a* is (continuously) limited to the free placement area 5 or deactivated. Alternatively thereto, an obstacle recognition signal is prevented from being output by the first sensor unit 7*a* or the obstacle recognition device 6 or an output obstacle recognition signal is prevented from being ignored (in particular by the data processing unit). The third method step $S_3$ is in particular carried out as long as the lift truck is in the placement operating mode. Once the lift truck 1 has placed down the picked-up pallet 2 and/or the picked-up pallet cage, it moves out of the free placement area 5. In this case, at least the second sensor unit 7*b* is activated. In addition, the first sensor unit 7*a* can also be reactivated or corresponding obstacle recognition signals of the first sensor unit 7*a* lead to a trigger reaction again.

In the second and third method steps $S_2$, $S_3$, the control apparatus monitors, based on a signal of the encoder unit and/or another position signal, that the maximum distance traveled is less than or equal to the depth of the previously cleared area, i.e. the lift truck 1 does not travel beyond the cleared area (i.e. the free placement area 5).

It would generally be conceivable for the data processing unit to be a part of the control apparatus and/or a part of the obstacle recognition device 6.

The invention is not restricted to the embodiments described. Within the scope of the invention, all the described and/or drawn features can be combined with one another as desired.

REFERENCE NUMERAL LIST autonomously moving lift truck 1
pallet 2
forks 3
goods 4
free placement area 5
obstacle recognition device 6
first sensor unit 7*a*
second sensor unit 7*b*
monitored field 8
control apparatus having a data processing unit 9
method steps $S_1$, $S_2$, $S_3$

The invention claimed is:

1. An autonomously moving transport system for transporting at least one of pallets and pallet cages, wherein the transport system comprises a pick-up apparatus for picking up said at least one of the pallet and the pallet cage in a placement process, wherein the transport system comprises a drive unit and a control apparatus comprising a data processing unit and an obstacle recognition device having a first sensor unit, wherein the first sensor unit is configured to generate a monitored field in order to examine a free placement area for said at least one of the pallet and the pallet cage between other pallets and/or pallet cages for obstacles, wherein the control apparatus is configured to control the drive unit such that the transport system, in the absence of an obstacle, adopts a placement operating mode and moves said at least one of the pallet and the pallet cage into the free placement area for placement, wherein the obstacle recognition device controls the first sensor unit so as to continuously limit its monitored field to a part of the free placement area that has not yet been traveled over based on a distance travelled, and wherein in the placement operating mode:

a) the obstacle recognition device is configured to deactivate the monitored field or not to output the obstacle recognition signal during the travel over the free placement area, at least until the placement of the pallet and/or the pallet cage on the free placement area; or b) the data processing unit is configured to ignore the obstacle recognition signal of the obstacle recognition device during the travel over the free placement area, at least until the placement of the at least one of the pallet and the pallet cage on the free placement area so as to avoid triggering the obstacle recognition device which would interrupt the placement process, and thereby allow placement of the pallets and/or pallet cages close to one another.

2. The autonomously moving transport system in accordance with claim 1, wherein the control apparatus is configured to control the drive unit such that the transport system only travels on a cleared region established by the free placement area in the placement operating mode.

3. The autonomously moving transport system in accordance with claim 1, wherein the transport system comprises an encoder unit, wherein the encoder unit is configured to continuously determine a distance traveled in the placement operating mode, and wherein the obstacle recognition device is configured to continuously limit the monitored field based on the distance determined.

4. The autonomously moving transport system in accordance with claim 3, wherein the encoder unit is arranged at a drive shaft of the drive unit.

5. The autonomously moving transport system in accordance with claim 1, wherein the obstacle recognition device is configured to limit the monitored field by adjusting a radiation angle of the first sensor unit.

6. The autonomously moving transport system in accordance with claim 1, wherein the obstacle recognition device or the data processing unit is configured to limit the monitored field by masking certain regions.

7. The autonomously moving transport system in accordance with claim 1, wherein the first sensor unit comprises an optical sensor, an acoustic sensor, or an electromagnetic sensor.

8. The autonomously moving transport system in accordance with claim 7, wherein the optical sensor is a Time of Flight (ToF) sensor and/or a laser scanner.

9. The autonomously moving transport system in accordance with claim 1, wherein the pick-up apparatus comprises forks, and wherein the first sensor unit is arranged at one end of at least one fork.

10. The autonomously moving transport system in accordance with claim 1, wherein the first sensor unit is arranged at a lower region of the transport system, and wherein the control apparatus is configured to control the pick-up apparatus such that the latter raises the pallet and/or the pallet cage so that the monitored field of the first sensor unit extends below the pallet and/or the pallet cage in the direction of the free placement area in order to examine the latter for obstacles.

11. The autonomously moving transport system in accordance with claim 1, wherein the obstacle recognition device comprises a second sensor unit, and wherein the first sensor unit is arranged at the rear side of the transport system and the second sensor unit is arranged at the front side of the transport system.

12. The autonomously moving transport system in accordance with claim 11, wherein the control apparatus is configured to reduce a speed at which the transport system travels over the free placement area compared to a speed at which the transport system is moved when the second sensor unit is arranged at the front in a direction of movement of the transport system.

13. The autonomously moving transport system in accordance with claim 1, wherein the drive unit is an electrical drive unit and wherein the control apparatus is configured in the placement operating mode to monitor power consumption of the drive unit, and wherein, in the event that the power consumption of the drive unit exceeds a threshold value, the control apparatus controls the drive unit such that the latter stops the transport system or moves the transport system out of the free placement area.

14. A method of operating an autonomously moving transport system for transporting at least one of pallets and pallet cages in a placement process, comprising the following method steps:

generating a monitored field to examine a free placement area for a pallet and/or pallet cage to be placed between other pallets and/or pallet cages for obstacles, controlling a drive unit so that the transport system, in the absence of an obstacle, adopts a placement operating mode and moves the pallet and/or the pallet cage into the free placement area for placement; and deactivating the monitored field or preventing an obstacle recognition signal from being output or ignoring an obstacle recognition signal as long as the transport system is in the placement operating mode, and responding to the obstacle recognition signal so as to continuously limit the monitored field to a part of the free placement area that has not yet been traveled over based on a distance travelled, and avoiding triggering obstacle recognition device which would interrupt the placement process, and thereby allow placement of the pallets and/or pallet cages close to one another.

15. An autonomously moving transport system for transporting at least one of pallets and pallet cages, wherein the transport system comprises a pick-up apparatus for picking up said at least one of the pallet and the pallet cage in a placement process, wherein the transport system comprises a drive unit and a control apparatus comprising a data processing unit and an obstacle recognition device having a first sensor unit, wherein the first sensor unit is configured to generate a monitored field in order to examine a free placement area for said at least one of the pallet and the pallet cage between other pallets and/or pallet cages for obstacles, wherein the control apparatus is configured to control the drive unit such that the transport system, in the absence of an obstacle, adopts a placement operating mode and moves said at least one of the pallet and the pallet cage into the free placement area for placement, wherein the obstacle recognition device controls the first sensor unit so as to continuously limit its monitored field to a part of the free placement area that has not yet been traveled over based on a distance travelled, and wherein in the placement operating mode, the data processing unit is configured to ignore the obstacle recognition signal of the obstacle recognition device during the travel over the free placement area, at least until the placement of the at least one of the pallet and the pallet cage on the free placement area so as to avoid triggering the obstacle recognition device which would interrupt the placement process, and thereby allow placement of the pallets and/or pallet cages close to one another.

* * * * *